H. I. DILTS.
WATER METER.
APPLICATION FILED DEC. 13, 1911.
1,138,640.
Patented May 11, 1915.
2 SHEETS—SHEET 2.
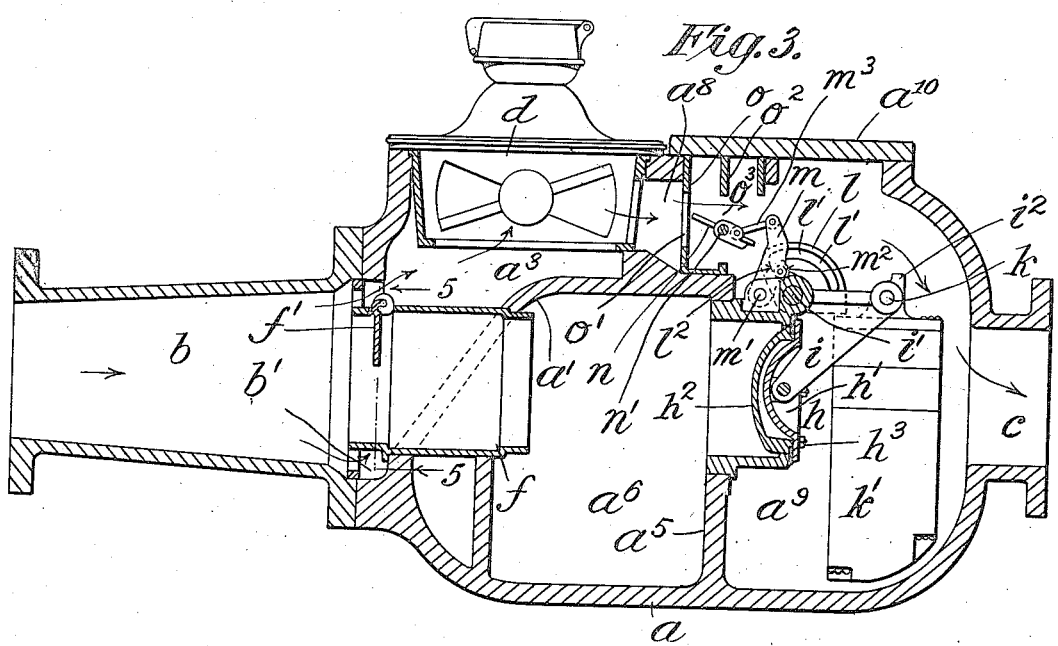
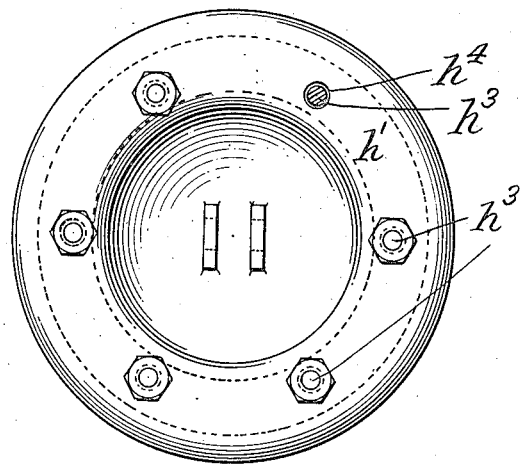
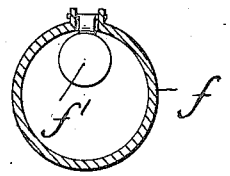
Attest:
Inventor:
Henry I. Dilts
by Redding, Greeley & Austin
Atty's.

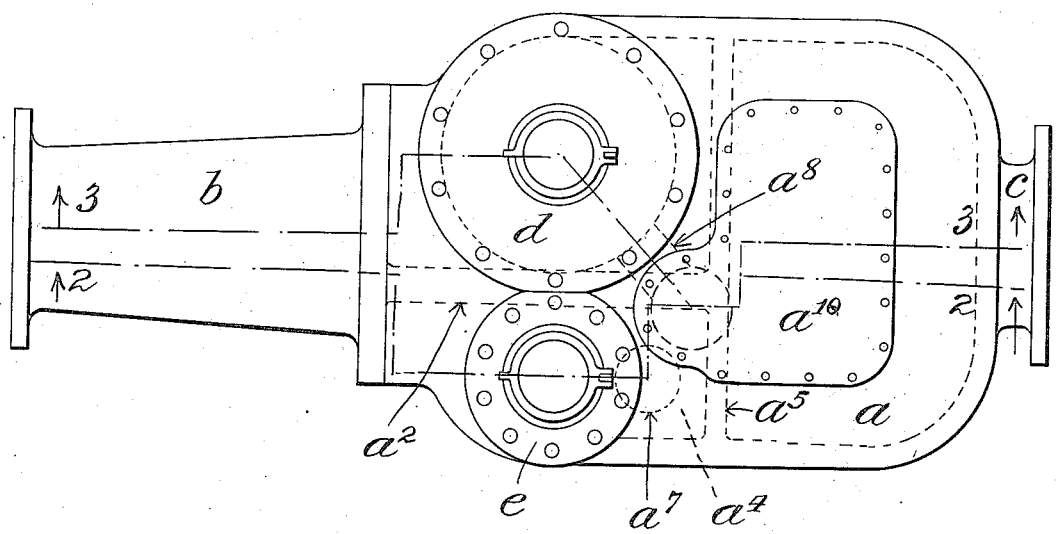
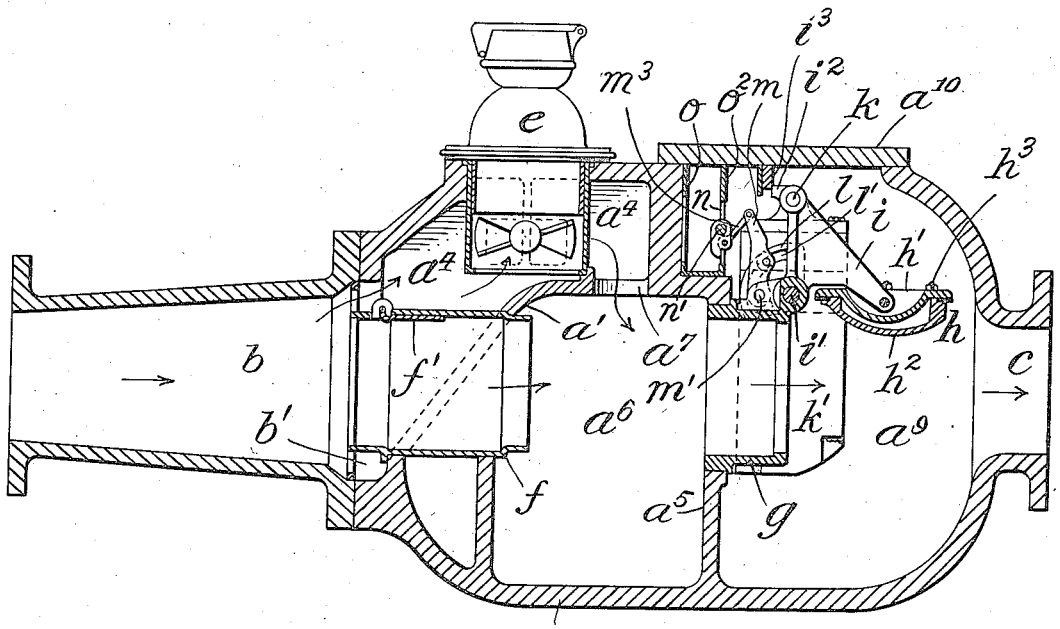

UNITED STATES PATENT OFFICE.

HENRY I. DILTS, OF LONG ISLAND CITY, NEW YORK, ASSIGNOR TO NEPTUNE METER COMPANY, OF NEW YORK, N. Y., A CORPORATION OF NEW JERSEY.

WATER-METER.

1,138,640.      Specification of Letters Patent.      Patented May 11, 1915.

Application filed December 13, 1911. Serial No. 665,494.

*To all whom it may concern:*

Be it known that I, HENRY I. DILTS, a citizen of the United States, residing in Long Island City, Queens county, State of New York, have invented certain new and useful Improvements in Water-Meters, of which the following is a specification, reference being had to the accompanying drawings, which form a part hereof.

This invention relates to compound water meters or water meters in which a high duty metering device and a low duty metering device are combined in one structure, the flow of the water through one or the other of these devices being determined by means operated by variations in the pressure differential. Various structures of this general character have been devised heretofore and have proved more or less satisfactory in use where the conditions are not such as to require an unobstructed, straight flow through the meter, from inlet to outlet, for fire purposes. They have generally been constructed, however, in such manner as to require the interposition of parts between the inlet and the outlet which cause a substantial loss of head or might prevent the passage through the meter of heavy bodies which, remaining in the meter, would obstruct the flow.

The object of this invention is to produce a meter of the general class referred to which shall show no substantial loss of accuracy at the time of the change from low duty flow to high duty flow, or vice versa, and shall permit a free and unobstructed straight flow through the meter, from inlet to outlet, without loss of head and without liability of becoming clogged by heavy bodies caught in the meter under conditions of high duty flow.

In accordance with the invention the improved meter has a straight path of flow from the inlet to the outlet under high duty conditions, the low duty metering devices and the high duty metering devices being placed outside of the straight path of flow under high duty conditions. The low duty metering device is preferably of the positive displacement type while the high duty metering device is of the proportional type, the total volume of water which, under high duty conditions passes through the meter, being determined by accurate measurement of a portion of the flow. Improved means are also provided for determining the flow through one or the other of the metering devices without substantial loss of accuracy at the time of change from one to the other.

The invention will be more fully explained hereinafter with reference to the accompanying drawings in which it is illustrated and in which—

Figure 1 is a top view of a meter which embodies the invention. Fig. 2 is a view of the same in longitudinal section on the irregular plane indicated by the broken line 2—2 of Fig. 1, the parts being represented in the positions which they assume under conditions of high duty flow. Fig. 3 is a view in longitudinal section on the irregular plane indicated by the broken line 3—3 of Fig. 1, the parts being in the positions which they assume under conditions of low duty flow. Fig. 4 is a detail view, on a larger scale, of the high duty valve shown in Figs. 2 and 3. Fig. 5 is a detail view in section on the plane indicated by the broken line 5—5 of Fig. 3, showing a device which may be employed for creating a pressure differential.

The casing $a$, provided with an inlet $b$ and an outlet $c$, both of substantially equal area, is preferably formed so as to accommodate within it both of the metering devices $d$ and $e$, the former for low duty and the latter for high duty. These two metering devices may be arranged in any convenient manner, being shown in the drawings as arranged side by side in the upper, forward portion of the casing. The metering devices $d$ and $e$ may be of any suitable character. As shown, the low duty metering device $d$ is a positive metering device, preferably a displacement or disk metering device and measures the whole flow under low duty conditions. The high duty metering device $e$ is also shown as a displacement or disk metering device, but as adapted to measure a proportional part of the whole flow under high duty conditions.

The casing $a$ is shown as formed near the inlet with an inclined wall $a'$ and above it with a longitudinal wall, shown in dotted lines at $a^2$ in Fig. 1, which forms a partial partition between the two chambers $a^3$ and $a^4$ in which the low duty and high duty metering devices are placed respectively, both of such chambers communicating with the inlet $b$. The casing is also provided with a transverse wall $a^5$ which forms an intermediate chamber $a^6$, with which the chamber $a^4$ communicates through a port $a^7$, while the low duty chamber $a^3$ communicates through a port $a^8$ with the chamber $a^9$ to the rear of the transverse wall $a^5$. An inlet nozzle $f$, the area in cross section of which is substantially equal to the area of the outlet $c$, is mounted in the inclined wall $a'$ and is of smaller diameter than the inlet opening $b'$, an annular opening being thus left around the inlet nozzle $f$ through which the whole volume of the water may pass from the inlet $b$ to the chamber $a^3$ and through the low duty measuring device, or through which a portion of the water may pass to the chamber $a^4$ and through the high duty metering device $e$, the inclined wall $a'$ assisting to divert a portion of the flow, under high duty conditions, to the chamber $a^4$. The wall $a^5$ supports a sleeve $g$ which has an area in cross section substantially equal to that of the inlet nozzle $f$ and to that of the outlet $c$, and supports and forms a seat for the valve which prevents straight flow through the meter under low duty conditions and compels the flow at such time through the low duty measuring device.

The sleeve $f$ may be provided with a small pivoted flap $f'$ to assist in creating some pressure differential under conditions of high duty flow and in diverting from the direct path through the meter a sufficient portion of the total flow to actuate the high duty metering device.

A valve $h$ which, under conditions of low duty flow, closes the direct path through the meter, coöperates with the sleeve $g$ which forms the valve seat and also supports the valve. The valve itself comprises a main part $h'$ and a relatively movable part $h^2$, which forms an extension from the main part and enters within the sleeve $g$ with a good working fit so that the valve may move as a whole to some extent before the escape of water through the sleeve $g$ is permitted. The part $h^2$ is movable transversely with respect to the main part $h'$ so that it shall fit properly within the sleeve $g$, without binding, even if the main part $h'$ should be displaced slightly, through wear of the supporting devices or from any other cause. To permit such relative movement of the extension $h^2$, it may be held to the main part $h'$ by bolts $h^3$ secured to the extension $h^2$ and smaller in diameter than the holes $h^4$ in the main part $h'$ through which they pass, as shown clearly in Fig. 4.

The valve $h$ is pivotally mounted on a quadrant or bell crank $i$ which is pivoted at $i'$ on the sleeve $g$. In the other arm of the quadrant or bell crank is mounted a shaft $k$ which carries at its ends, on opposite sides of the sleeve $g$, weights which, as shown in Fig. 3, keep the valve $h$ closed against the pressure of the water within the meter until the pressure differential rises to the predetermined degree for permitting high duty flow. One of such weights is shown at $k'$ in Figs. 2 and 3. The other weight, if used, is mounted in a corresponding manner and need not be shown. Mounted to move with the quadrant or bell crank $i$ is a cam quadrant $l$ formed with a slot or groove $l'$ which is concentric with the shaft $i'$ for the greater part of its length but has at one end a jog or offset $l^2$. A lever $m$, pivoted at $m'$, has a projecting roller $m^2$ which enters the cam slot $l'$. The lever $m$ is operatively connected, as by a link $m^3$, with a valve $n$ which controls communication between the chamber $a^8$ of the low duty metering device and the discharge chamber $a^9$. The valve $n$ may be of any suitable character which will permit it to be opened or closed quickly. It is shown in Fig. 3 of the drawings as a butterfly valve pivoted at $n'$ in a valve box $o$ which is interposed between the chamber $a^8$ and the discharge chamber $a^9$, is covered and held in place by the cap $a^{10}$ of the casing $a$, and has a port $o'$ to communicate with the chamber $a^8$, and a diaphragm $o^2$ provided with a port $o^3$ adapted to be closed or opened by the valve $n$.

In the operation of the improved meter under low duty conditions the valves occupy the positions shown in Fig. 3, being held in such positions by the weight or weights $k'$. The differential pressure between the inlet and the outlet is then so small that the valve $h$ is held to its seat by the weight or weights $k'$, thereby preventing the flow of water in the straight path through the meter. The water which then flows through the meter under the low pressure differential passes from the inlet $b$ through the annular port $b'$ into the chamber $a^3$ through the low duty metering device $d$ and thence through the passage $a^8$, port $o'$ and port $o^3$, into the discharge chamber $a^9$ from which it escapes through the outlet $c$. The total flow under low duty conditions therefore passes through the low duty metering device $d$ and is measured positively thereby.

When the pressure differential between the inlet and the outlet increases to the degree predetermined for flow under high duty conditions the valve $h$ is first moved slightly but without withdrawing the extension $h^2$ far enough to permit the escape of water to any material extent. During this preliminary movement of the valve the cam quadrant acts upon the projection $m^2$ of the lever $m$ to throw the projection out of the portion $l^2$ of the cam groove or slot into the circular arc portion $l'$ thereof. The movement of the lever produced in this manner is very quick and the valve $n$ is therefore thrown instantly from open position to closed position, in which it is thereafter supported by the engagement of the projection $m^2$ in the circular arc portion $l'$ of the cam groove or slot. The closing of the valve $n$ instantly stops the flow through the low duty metering device, thereby stopping its registration. The continued high pressure differential causes the movement of the valve $h$ to be continued and as it continues the resistance offered by the weight or weights $k'$ is reduced as the support of the weight or weights approaches the vertical plane of the axis about which the bell crank or quadrant $i$ moves, so that when the valve has once been opened it remains open without causing any substantial loss of head. A stop $i^2$ on the quadrant $i$ coöperates with a fixed stop $i^3$ to limit the opening movement of the quadrant when the valve $h$ has been raised to its highest position, substantially above the direct flow, as shown in Fig. 2. When the valve $h$ has been opened as described, a portion of the water flows through the inlet nozzle $f$ and straight through the meter, without being deflected or caused to suffer any substantial loss of head. As is well understood in the meter art the water admitted through the inlet $b$ will fill the entire space within the meter casing, when the entrapped air has been discharged in accordance with the usual practice, notwithstanding the fact that the area of the inlet is substantially equal to the area of the outlet. A portion of the total volume of water will therefore pass through the opening $b'$ around the inlet nozzle $f$ into the chamber $a^4$, through the high duty, proportional metering device $e$, and thence through the port $a^7$ into the intermediate chamber $a^6$ from which it flows, with that portion of the volume of water which passes through the inlet nozzle $f$, through the sleeve $g$ into the chamber $a^9$ and so through the outlet $c$. The area of the port or passage $b'$ is such as to permit a substantial portion of the total flow to pass through it, so that the high duty metering device $e$ is operated with certainty. The proper flow of this portion of the total volume is facilitated by the inclined wall $a'$ and if necessary a pressure differential may be created by the flap $f'$, although no device for this purpose will be required ordinarily. When the pressure differential between the inlet and the outlet pressures falls below the predetermined degree for flow under high duty conditions the valve $h$ is reseated by the weight or weights $k'$.

It will be understood that forms of metering devices other than those indicated may be employed to suit different conditions and that such metering devices may be arranged in different relations. It will also be evident that the valves and their supporting and operating connections may be varied to suit different conditions. The invention, therefore, is not restricted to the particular construction and arrangement of parts shown and described herein.

I claim as my invention:—

1. The combination with a meter casing having a transverse wall with an aperture therethrough, of a valve to close said aperture, said valve comprising a main part and a projecting part secured positively thereto to enter the aperture and relatively movable with respect to the main part, and a lever arm to support the valve and pivotally connected to said main part.

2. In a meter having a high-duty passage and a low-duty passage the combination of a valve seat in the high-duty passage, a valve to coöperate therewith, a bell crank lever mounted above the valve seat and to one arm of which the valve is connected, a weight connected to the other arm of the bell crank lever, a valve to control the low-duty passage, and means independent of said valves and actuated by the opening movement of the high-duty valve to close the low-duty valve.

3. In a meter having a low-duty passage and a high-duty passage, the combination of a valve seat in the high-duty passage, a valve to coöperate therewith, a bell crank lever mounted above the valve seat and to one arm of which the valve is connected, a weight connected to the other arm of the bell crank lever, a valve to control the low-duty passage, a lever operatively connected to the low-duty valve and a cam plate in operative relation with said last-named lever and connected to the bell crank lever to move therewith.

4. In a meter having a low-duty passage and a high-duty passage, the combination of a valve seat in the high-duty passage, a valve to coöperate therewith, a bell crank lever mounted above the valve seat and to one arm of which the valve is connected, a weight connected to the other arm of the bell crank lever, a valve to control the low-duty passage, a lever operatively connected to the low-duty valve and a cam plate having a cam slot with a concentric portion and an offset engaged by a projection from the lever connected to the low-duty valve.

This specification signed and witnessed this 12th day of December, A. D. 1911.

HENRY I. DILTS.

Signed in the presence of—
 W. B. GREELEY,
 WORTHINGTON CAMPBELL.